(12) United States Patent
Akcay et al.

(10) Patent No.: US 11,306,992 B2
(45) Date of Patent: Apr. 19, 2022

(54) TEST SYSTEM FOR THROWING MECHANISMS

(71) Applicant: TUSAS—TURK HAVACILIK VE UZAY SANAYII ANONIM SIRKETI, Ankara (TR)

(72) Inventors: Ali Akcay, Ankara (TR); Onur Imece, Kazan/Ankara (TR); Sabri Senturk, Kazan/Ankara (TR); Nihat Serkan Akcay, Kazan/Ankara (TR)

(73) Assignee: TUSAS—TURK HAVACILIK VE UZAY SANAYII ANONIM SIRKETI, Ankara (TR)

( * ) Notice: Subject to any disclaimer, the term of this patent is extended or adjusted under 35 U.S.C. 154(b) by 0 days.

(21) Appl. No.: 17/261,668

(22) PCT Filed: Jul. 31, 2019

(86) PCT No.: PCT/TR2019/050640
§ 371 (c)(1),
(2) Date: Jan. 20, 2021

(87) PCT Pub. No.: WO2020/032896
PCT Pub. Date: Feb. 13, 2020

(65) Prior Publication Data
US 2021/0293505 A1 Sep. 23, 2021

(30) Foreign Application Priority Data
Aug. 8, 2018 (TR) .................................. 2018/11490

(51) Int. Cl.
*F41A 31/00* (2006.01)
*F41A 19/00* (2006.01)
(Continued)

(52) U.S. Cl.
CPC .............. *F41A 31/00* (2013.01); *F41A 19/00* (2013.01); *G01M 13/00* (2013.01); *G01M 99/008* (2013.01)

(58) Field of Classification Search
None
See application file for complete search history.

(56) References Cited

U.S. PATENT DOCUMENTS

| 3,659,462 A | 5/1972 | Cole |
| 5,351,597 A | 10/1994 | Holmstrom et al. |
| 2015/0204638 A1* | 7/2015 | Frazier ...................... F41J 9/24 124/6 |

FOREIGN PATENT DOCUMENTS

| CN | 204788873 U | 11/2015 |
| CN | 105865743 A | 8/2016 |

OTHER PUBLICATIONS

International Search Report and Written Opinion or corresponding PCT application No. PCT/TR2019/050640, dated May 18, 2020.
(Continued)

*Primary Examiner* — Douglas X Rodriguez
*Assistant Examiner* — Carl F. R. Tchatchouang
(74) *Attorney, Agent, or Firm* — Notaro, Michalos & Zaccaria P.C.

(57) ABSTRACT

A throwing mechanism that is located at an upper part of the chassis onto which at least one weight is attached and provides throwing the weight attached thereto. A base is located at a lower part of the chassis and onto which a weight is thrown by the throwing mechanism, at least one position adjuster is located on the base and provides aligning on the base the weight thrown onto the base so that it faces the throwing mechanism, and a control unit which enables to operate the position adjuster to move the base upwards so as to re-attach the weight to the throwing mechanism, and thus to test the throwing mechanism automatically.

9 Claims, 3 Drawing Sheets

(51) Int. Cl.
*G01M 13/00* (2019.01)
*G01M 99/00* (2011.01)

(56) References Cited

OTHER PUBLICATIONS

International Preliminary Report of Patentability for corresponding PCT application No. PCT/TR2019/050640, completed Sep. 4, 2020.
Written Opinion of the International Preliminary Examining Authority for corresponding PCT application No. PCT/TR2019/050640, dated Aug. 3, 2020.

* cited by examiner

TEST SYSTEM FOR THROWING MECHANISMS

The present invention relates to systems in which life tests are performed for the throwing mechanisms that provide throwing a weight to a target point.

In order to release or throw ammunition to a target point, throwing mechanism are utilised in air vehicles. In addition, for various carrying systems, there exists throwing mechanisms that provide holding or releasing or throwing a weight. Life tests of said throwing systems are generally performed such that a weight is repeatedly attached to the throwing mechanism by manpower.

Patent document no U.S. Pat. No. 5,351,597A covered by the known art discloses a reliable release system which is able to operate in accordance with different types of ammunition. The system comprises an electronic system with electrical characteristics suitable for different types of ammunition, and an ammunition carrying unit. An indication unit is provided in the ammunition carrying unit, wherein the indication unit indicates the ammunition type that is placed at the carrying unit. Said ammunition is released by a control unit which is provided in said system. However, life test of the ammunition system is not mentioned.

In the known art, life tests of throwing mechanisms are carried out by manpower. Weight that is thrown out of the throwing mechanism is re-attached to the throwing mechanism by the manpower so that the throwing mechanism is operated once again. This process may be repeated over and over. Life test is performed for the throwing mechanism itself. Performing re-attaching process of the weight to the throwing mechanism by a human causes various work-related accidents, test errors and/or time losses.

Thanks to the test system of the present invention, throwing mechanisms which are used in air vehicles to throw ammunition can be tested independently of the manpower; thus an easy-to-use, practical, effective, efficient and reliable test system is achieved.

Another object of the present invention is to provide a test system for performing life tests of throwing mechanisms in an automated and controlled manner.

A further object of the present invention is to provide a test system which provides performing tests of throwing mechanisms independently of manpower.

Yet another object of the present invention is to provide a simple, easy-to-use, practical, effective, efficient and reliable test system.

The test system for achieving the object of the present invention which is defined in the first claim and the dependent claims thereof comprises a chassis; a throwing mechanism located at an upper part of the chassis; a weight to be thrown which is attached to the throwing mechanism; a base which is located on the chassis under the throwing mechanism and onto which a weight falls, the weight being thrown by the throwing mechanism; a position adjuster located on the base and adjusting the position of the weight, which has fallen onto the base, such that the weight is aligned with the throwing mechanism; and a control unit which provides controlling the position adjuster, to move the base, on which the weight falls, upwards so as to re-attach the weight to the throwing mechanism, and thus to perform life test (life of operating properly) (fatigue) automatically (zero-touch) on the throwing mechanism.

Test system of the present invention comprises a position adjuster which has a first aligning means and a second aligning means that are located on the base, and a first position (I) in which the first aligning means and the second aligning means are away from each other and a second position (II) in which the first aligning means and the second aligning means are approached so as to be brought together by the control unit and the weight is compressed in between them. When the position adjuster is in the second position (II), the weight is positioned on the base so as to face the throwing mechanism. Therefore, by raising the base once again, the weight is provided to be attached to the throwing mechanism automatically.

In an embodiment of the invention, the test system comprises a position adjuster having a second position (II) in which the first aligning means and/or the second aligning means push the weight so that the weight is brought.

In an embodiment of the invention, the test system comprises a position adjuster which is kept at the second position (II) by the control unit while the weight that has fallen onto the base is re-attached to the throwing mechanism.

In an embodiment of the invention, the test system comprises a quadrangular weight and a position adjuster which provides pushing the weight diagonally by the first aligning means and the second aligning means at two corners thereof so that the weight is aligned.

In an embodiment of the invention, the test system comprises a position adjuster having an angled first aligning means and an angled second aligning means.

In an embodiment of the invention, the test system comprises a position adjuster having at least one rail which is located on the base and on which the first aligning means and/or the second aligning means are provided in a movable manner.

In an embodiment of the invention, the test system comprises at least one piston which is located on the base and provides moving the first aligning means and/or the second aligning means, which are located on the rail, along a linear path by pushing or pulling.

In an embodiment of the invention, the test system comprises a plurality of balls which are located on the base so as to rotate around the centre and to move up and down, and which provide sliding the weight on the base.

In an embodiment of the invention, the test system comprises a rail which provides moving the first aligning means and/or the second aligning means without contacting the ball.

In an embodiment of the invention, the test system comprises a throwing mechanism suitable for use in air vehicles to throw weights such as ammunition etc.

In an embodiment of the invention, the test system enables that a life test is performed automatically (zero-touch) on a throwing mechanism which is used in air vehicles.

The test system realized to achieve the object of the present invention is illustrated in the attached drawings, in which.

Figure 1:
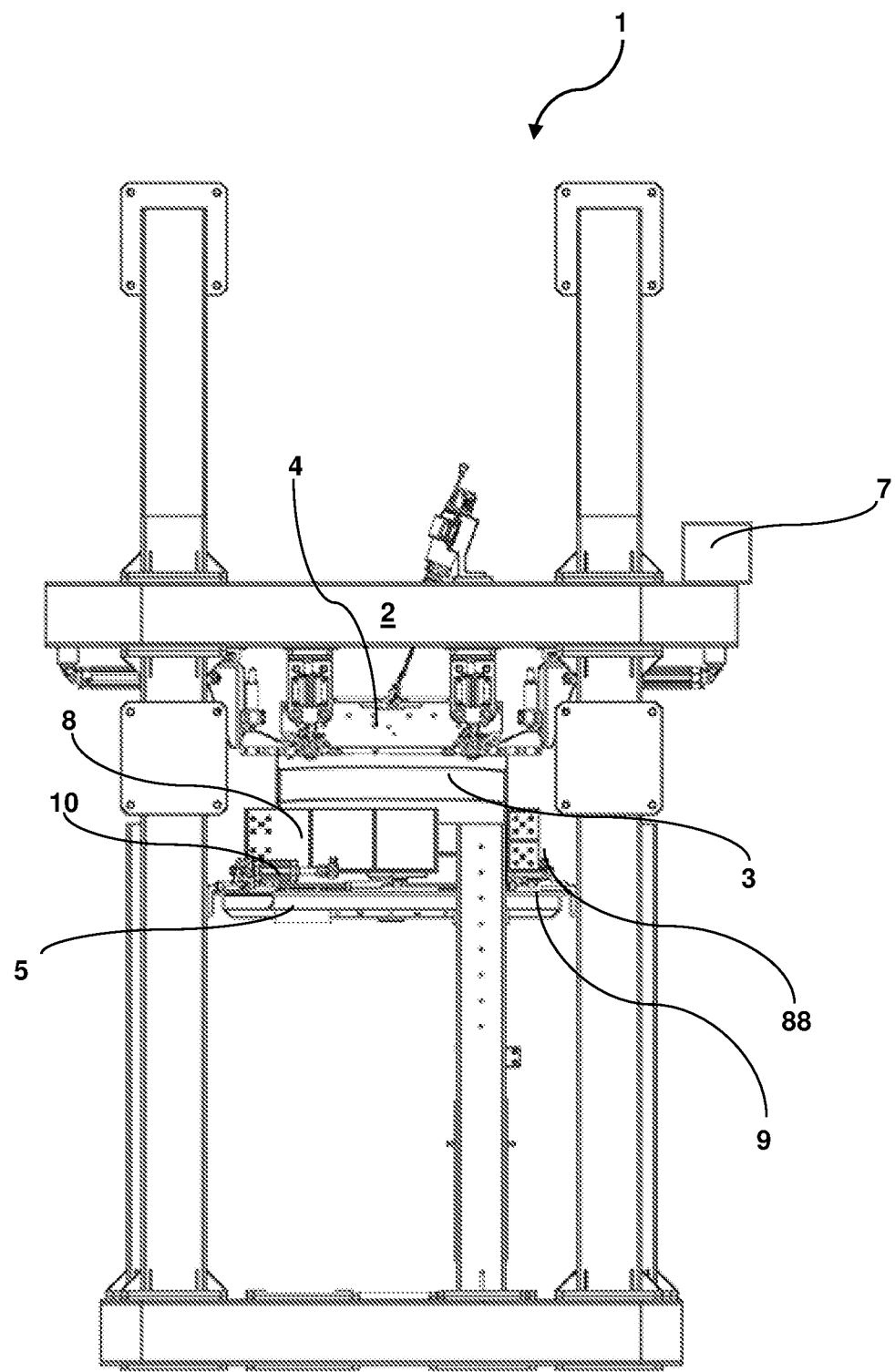
FIG. 1 is a front view of a movement mechanism.

All the parts illustrated in figures are individually assigned a reference numeral and the corresponding terms of these numbers are listed below:

1. Test System
2. Chassis
3. Weight

4. Throwing Mechanism
5. Base
6. Position Adjuster
7. Control Unit
8. First Aligning Means
88. Second Aligning Means
9. Rail
10. Piston
11. Ball The test system (1) comprises a chassis (2); a throwing mechanism (4) which is located at an upper part of the chassis (2), onto which at least one weight (3) is attached and which provides throwing the weight (3) attached thereto; a base (5) which is located at a lower part of the chassis (2) and onto which a weight (3) is thrown by the throwing mechanism (4); at least one position adjuster (6) which is located on the base (5) and provides aligning on the base (5) the weight (3) thrown onto the base (5) so that it faces the throwing mechanism (4); and a control unit (7) which provides operating the position adjuster (6), to move the base (5) towards the throwing mechanism (4) so as to re-attach the weight (3) to the throwing mechanism (4), and thus to test the throwing mechanism (4) automatically (FIG. 1).

Figure 2:
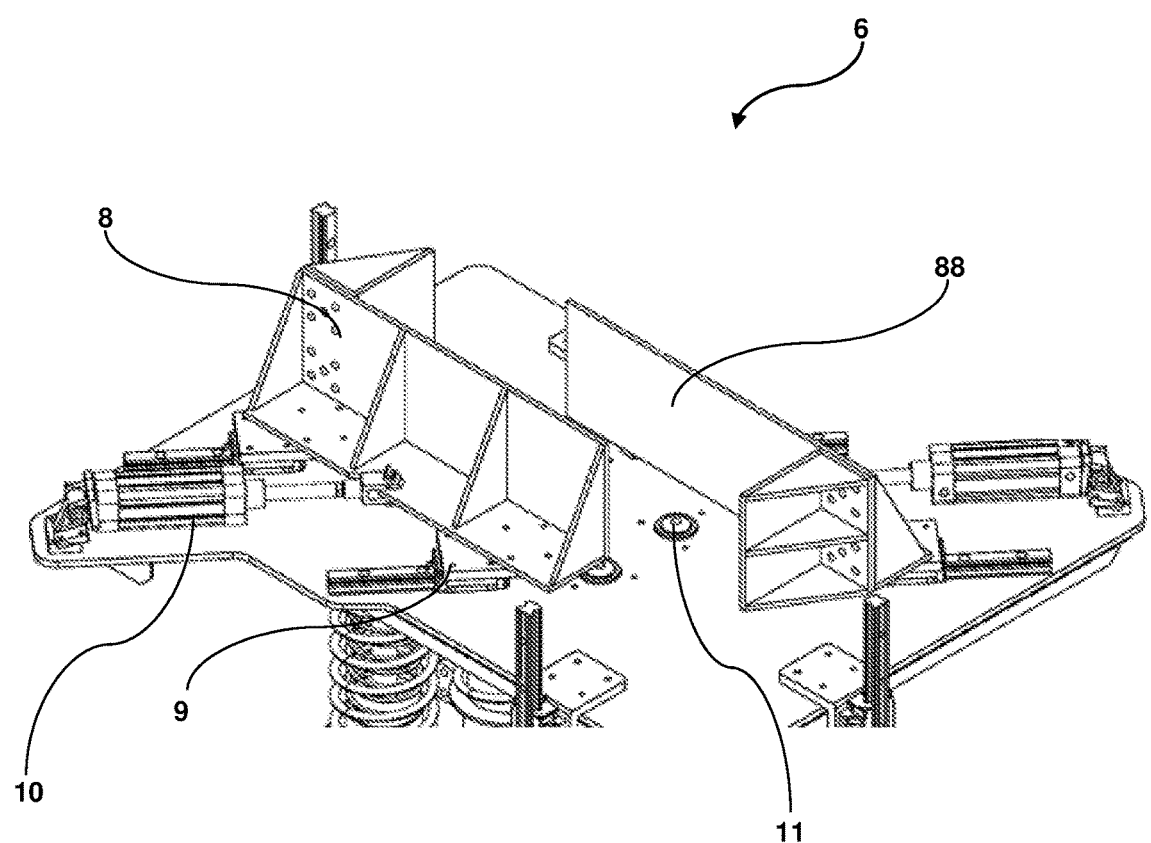
FIG. 2 is a perspective view of the position adjuster and the base.
Figure 3:
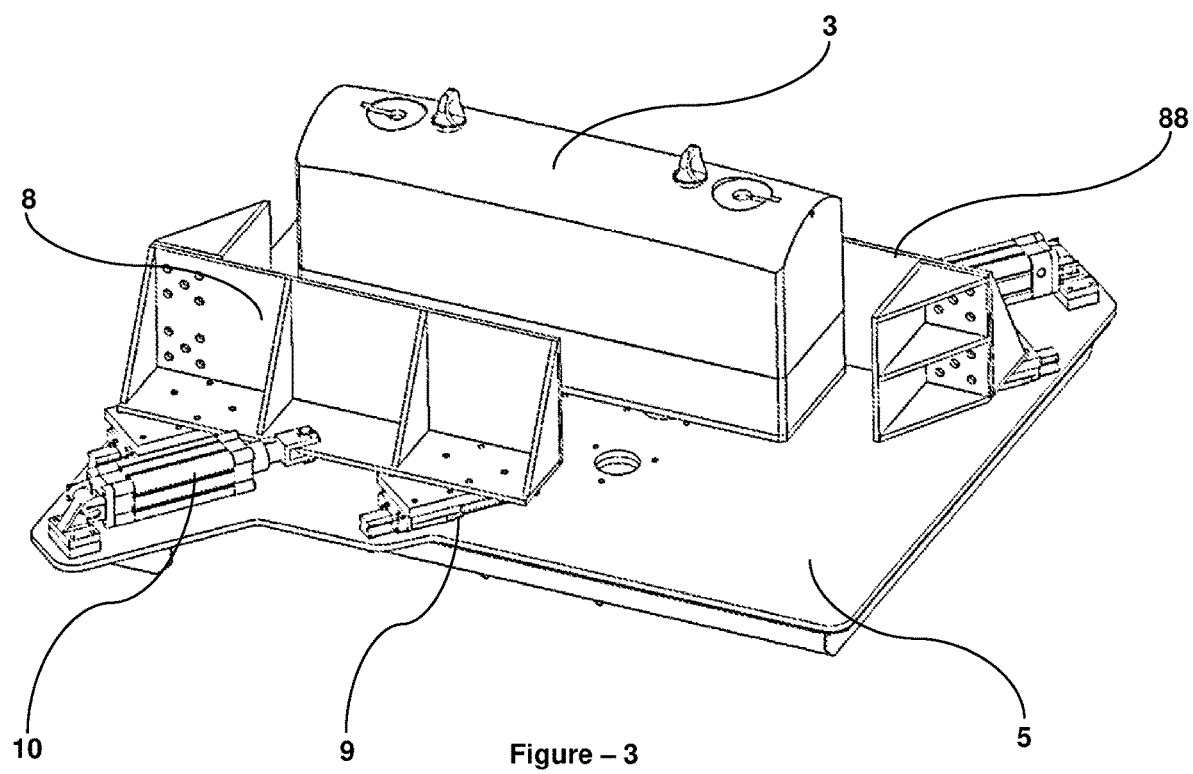
FIG. 3 is a perspective view of the weight, the position adjuster and the base.
Figure 4:
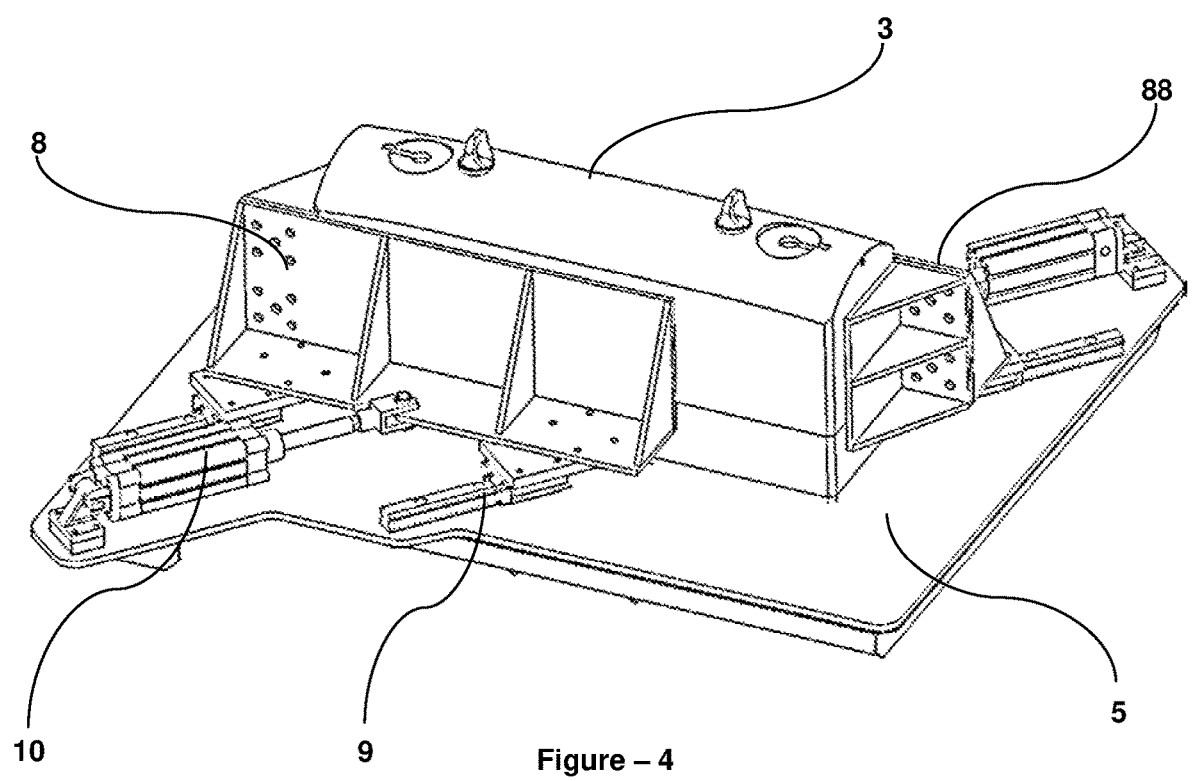
FIG. 4 is a perspective view of the weight, the position adjuster and the base when the position adjuster is in second position (II).

Test system (1) of the present invention comprises a position adjuster (6) which has at least a first aligning means (8) that is located on the base (5) and at least a second aligning means (88) that is located on the base (5) so as to face the first aligning means (8); and a control unit (7) which provides bringing the first aligning means (8) and the second aligning means (88) to a first position (I) in which they are away from each other and to a second position (II) in which they are approached such that the weight (3) is compressed in between. (FIG. 2, FIG. 3 and FIG. 4).

The weight (3) is thrown out of the throwing mechanism (4) by means of the control unit (7). When the weight (3) falls onto the base (5), its position on the base (5) is changed so that the weight (3) faces the throwing mechanism (4) in order to be re-attached to the throwing mechanism (4) by means of the position adjuster (6). The base (5) is raised by the control unit (7), thus re-attaching the weight (3) to the throwing mechanism (4). Throwing the weight (3) out of the throwing mechanism (4) and re-attaching the same to the throwing mechanism (4) is performed repeatedly. Therefore, it is controlled whether the throwing mechanism (4) operates properly. Thus, life test is performed on the throwing mechanism (4) in a fully automatic way without human intervention.

Thanks to the first aligning means (8) and/or the second aligning means (88), the weight (3) that is thrown onto the base (5) is brought to a region on the base (5) which is predetermined by the manufacturer in order to re-attach the weight (3) to the throwing mechanism (4). Therefore, when the base (5) is raised upwards, the weight (3) can be re-attached to the throwing mechanism (4). While the weight (3) is thrown onto the base (5), the first aligning means (8) and the second aligning means (88) are in the first position (I) in which they are away from each other and which allows the weight (3) to fall onto the base (5) with ease. When the weight (3) is thrown onto the base (5), the first aligning means (8) and the second aligning means (88) are switched from the first position (I) to the second position (II) such that the weight (3) remains in between by means of the control unit (7) and that they approach each other sufficiently to bring the weight (3) to a position on the base (5) which is predetermined by the manufacturer. Thus, it is ensured that the weight (3) is attached to the throwing mechanism (4) automatically.

In an embodiment of the invention, the test system (1) comprises a first aligning means (8) and/or a second aligning means (88) to align the weight (3) on the base (5) by dragging. The weight (3) thrown onto the base (5) is dragged along the base (5) by the first aligning means (8) and/or the second aligning means (88) while the first aligning means (8) and the second aligning means (88) facing each other are switched from the first position (I) to the second position (II), and the weight (3) is aligned so as to face the throwing mechanism (4).

In an embodiment of the invention, the test system (1) comprises a first aligning means (8) and a second aligning means (88) which are kept at the second position (II) by the control unit (7) while the weight (3) thrown onto the base (5) is re-attached to the throwing mechanism (4). While the weight (3) is attached to the throwing mechanism (4), the position adjuster (6) is kept at the second position (II) in which the weight (3) is in alignment with the throwing mechanism (4). Therefore, it is ensured that the weight (3) remains in a fixed position without sliding along the base (5). Thus, the weight (3) can be effectively and easily attached to the throwing mechanism (4) without human intervention.

In an embodiment of the invention, the test system (1) comprises a quadrangular weight (3), and a first aligning means (8) that moves the weight (3) by pushing it at a corner thereof and a second aligning means (88) that moves the weight (3) by pushing it concurrently at the farthest corner to the corner at which the weight (3) is pushed by the first aligning means (8). The weight (3) used for testing is quadrangular. Therefore, the weight (3) is pushed by the first aligning means (8) and the second aligning means (88) at only two opposed corners so that it is brought to a desired position on the base (5).

In an embodiment of the invention, the test system (1) comprises a position adjuster (6) having an "L" shaped first aligning means (8) and an "L" shaped second aligning means (88). The first aligning means (8) and the second aligning means (88) have an angled form. Therefore, the weight (3) can be efficiently brought to a desired position on the base (5).

In an embodiment of the invention, the test system (1) comprises a position adjuster (6) having at least one rail (9) which is located on the base (5) and provides moving the first aligning means (8) and/or the second aligning means (88) thereon. The rail (9) is provided on the base (5) such that it extends lengthwise. Due to the rail (9), the first aligning means (8) and/or the second aligning means (88) are capable of moving linearly on a certain path. Thus, by moving forward on the rail (9), the first aligning means (8) and/or the second aligning means can brought the weight (3) on the base (5) to the predetermined position.

In an embodiment of the invention, the test system (1) comprises at least one piston (10) which is located on the base (5) and provides moving the first aligning means (8) and/or the second aligning means (88), which are located on the rail (9), by pushing or pulling. By means of the piston (10) that is preferably located higher than the rail (9), the first aligning means (8) and/or the second aligning means (88) are able to move along the rail (9). The piston (10) is controlled by the control unit (7). The piston (10) is nearly able to extend along the rail (9). The first aligning means (8) and/or the second aligning means (88) are pushed to be brought to the second position (II) when the piston (10) lies, and the first aligning means (8) and/or the second aligning means (88) are brought again to the first position (I) when the piston (10) is pulled.

In an embodiment of the invention, the test system (1) comprises a plurality of balls (11) which are located on the base (5) so as to rotate spherically and to move up and down, and which provide sliding the weight (3) on the base (5). When the weight (3) falls onto the ball (11), it is embedded into the base (5). Therefore, impact effect of the weight (3) onto the base (5) is at least partially dampened. In addition, the ball (11) can rotate spherically around the centre thereof. While the weight (3) is dragged on the base (5) by the first aligning means (8) and/or the second aligning means (88), effect of the friction force is reduced by means of the ball (11).

In an embodiment of the invention, the test system (1) comprises a rail (9) which provides locating the first aligning means (8) and/or the second aligning means (88) so that they are higher than the ball (11), thus provides moving the first aligning means (8) and/or the second aligning means (88) without contacting the ball (11). Thanks to the rail (9), the first aligning means (8) and/or the second aligning means (88) located on the rail (9) in a movable manner are provided on the base (5) such that it is provided higher than the ball (11).

In an embodiment of the invention, the test system (1) comprises a throwing mechanism (4) suitable for use in air vehicles to throw weights (3). The throwing mechanism (4) provides releasing and/or throwing the weight (3) of the ammunition type out of an air vehicle to a target.

In an embodiment of the invention, the test system (1) provides to test the throwing mechanism (4) used in air vehicles. Thanks to the test system (1), the weight (3) of the ammunition type is automatically thrown out of the throwing mechanism (4) and re-attached to the throwing mechanism (4) automatically. Therefore, the throwing mechanism (4) is operated more than once, and a life test is performed automatically thereon with zero-touch.

Thanks to the test system (1) of the present invention, throwing mechanisms (4) which are used to throw weight (3) such as ammunition, etc. can be tested independently of the manpower; thus, an easy-to-use, practical, effective, efficient and reliable test system (1) is achieved.

The invention claimed is:

1. A test system (1) comprising:
    a chassis (2);
    a throwing mechanism (4) which is located at an upper part of the chassis (2), onto which at least one weight (3) is attached and which provides throwing the at least one weight (3) attached thereto;
    a base (5) which is located at a lower part of the chassis (2) and onto which the at least one weight (3) is thrown by the throwing mechanism (4);
    at least one position adjuster (6) which is located on the base (5) and provides aligning on the base (5) the at least one weight (3) thrown onto the base (5) so that it faces the throwing mechanism (4); and
    a control unit (7) which provides operating the at least one position adjuster (6), to move the base (5) towards the throwing mechanism (4) so as to re-attach the at least one weight (3) to the throwing mechanism (4), and thus to test the throwing mechanism (4) automatically,
    wherein the at least one position adjuster (6) has at least a first aligning means (8) that is located on the base (5) and at least a second aligning means (88) that is located on the base (5) so as to face the at least first aligning means (8) and
    wherein the control unit (7) provides bringing the at least first aligning means (8) and the second aligning means (88) to a first position (I) in which they are away from each other and to a second position (II) in which they are approached such that the at least one weight (3) remains in between.

2. The test system according to claim 1, wherein the at least first aligning means (8) and/or the at least second aligning means (88) align the at least one weight (3) on the base (5) by dragging.

3. The test system according to claim 1, wherein the at least first aligning means (8) and the at least second aligning means (88) are kept at the second position (II) by the control unit (7) while the at least one weight (3) thrown onto the base (5) is re-attached to the throwing mechanism (4).

4. The test system (1) according to claim 1, wherein the at least first aligning means (8) moves the at least one weight (3) by pushing it at a corner thereof and the at least second aligning means (88) moves the at least one weight (3) by pushing it concurrently at the farthest corner to a corner at which the at least one weight (3) is pushed by the at least first aligning means (8).

5. The test system (1) according to claim 1, wherein the at least first aligning means (8) is "L" shaped and the at least second aligning means (88) is "L" shaped.

6. The test system (1) according to claim 1, wherein the at least one position adjuster (6) has at least one rail (9) which is located on the base (5) and provides moving the at least first aligning means (8) and/or the at least second aligning means (88).

7. The test system (1) according to claim 6, characterized in that the test system (1) comprises at least one piston (10) which is located on the base (5) and provides moving the at least first aligning means (8) and/or the at least second aligning means (88), which are located on the rail (9), by pushing or pulling.

8. The test system (1) according to claim 1, characterized in that the test system (1) comprises a plurality of balls (11) which are located on the base (5) so as to rotate spherically and to move up and down, and which provide sliding the at least one weight (3) to on the base (5).

9. The test system (1) according to claim 8, characterized in that the test system (1) comprises a rail (9) which provides locating the at least first aligning means (8) and/or the at least second aligning means (88) so that they are higher than the plurality of balls (11), thus provides moving the at least first aligning means (8) and/or the at least second aligning means (88) without contacting the plurality of balls (11).

* * * * *